(12) United States Patent
Jindal et al.

(10) Patent No.: US 9,794,954 B2
(45) Date of Patent: *Oct. 17, 2017

(54) SCHEDULING IN A CELLULAR COMMUNICATION SYSTEM USING A LARGE EXCESS NUMBER OF BASE STATION ANTENNAS

(71) Applicant: Avago Technologies General IP (Singapore) Pte. Ltd., Singapore (SG)

(72) Inventors: Nihar Jindal, Mountain View, CA (US); Murat Mese, Rancho Palos Verdes, CA (US); Arogyaswami Paulraj, Stanford, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/135,295

(22) Filed: Apr. 21, 2016

(65) Prior Publication Data

US 2016/0242198 A1    Aug. 18, 2016

Related U.S. Application Data

(63) Continuation of application No. 14/202,921, filed on Mar. 10, 2014, now Pat. No. 9,370,017.

(Continued)

(51) Int. Cl.
*H04W 72/12* (2009.01)
*H04W 16/14* (2009.01)
(Continued)

(52) U.S. Cl.
CPC .......... *H04W 72/121* (2013.01); *H04B 7/024* (2013.01); *H04B 7/0452* (2013.01); *H04W 16/14* (2013.01); *H04W 16/24* (2013.01); *H04W 72/1226* (2013.01)

(58) Field of Classification Search
CPC ........... H04W 72/121; H04W 72/1226; H04W 16/14; H04W 16/24; H04B 7/024; H04B 7/0452
(Continued)

(56) References Cited

U.S. PATENT DOCUMENTS 6,400,699 B1    6/2002    Airy
8,116,388 B2    2/2012    Tujkovic
(Continued)

OTHER PUBLICATIONS

Marzetta, Thomas L., "Noncooperative Cellular Wireless with Unlimited Numbers of Base Station Antennas," *IEEE Transactions on Wireless Communications*, vol. 9, No. 11, Nov. 2010, pp. 3590-3600.

*Primary Examiner* — Afsar M Qureshi
(74) *Attorney, Agent, or Firm* — Sterne, Kessler, Goldstein & Fox P.L.L.C.

(57) ABSTRACT

The present disclosure is directed to a system and method for selecting a sub-group of user terminals (UTs) among a group of UTs served by a sector of a cellular network to schedule independent data streams for transmission to over the same time-frequency interval. In one embodiment, the sub-group of UTs is selected to limit inter-user interference among the sub-group of UTs. In another embodiment, the sub-group of UTs is selected to limit inter-user interference experienced by a UT that is at or near the boundary of the sector that serves the sub-group of UTs.

20 Claims, 8 Drawing Sheets

Related U.S. Application Data

(60) Provisional application No. 61/943,022, filed on Feb. 21, 2014, provisional application No. 61/811,563, filed on Apr. 12, 2013, provisional application No. 61/811,572, filed on Apr. 12, 2013.

(51) Int. Cl.
*H04B 7/024* (2017.01)
*H04W 16/24* (2009.01)
*H04B 7/0452* (2017.01)

(58) Field of Classification Search
USPC .......................................................... 370/330
See application file for complete search history.

(56) References Cited

U.S. PATENT DOCUMENTS

| | | | | |
|---|---|---|---|---|
| 8,503,291 B1* | 8/2013 | Lee | ..................... | H04B 7/0617 370/208 |
| 8,693,442 B2 | 4/2014 | Baligh | | |
| 8,996,066 B1* | 3/2015 | Lee | ..................... | H04W 16/28 370/334 |
| 9,370,017 B2* | 6/2016 | Jindal | ..................... | H04W 72/121 |
| 2010/0273492 A1* | 10/2010 | Liu | ..................... | H04B 7/022 455/446 |
| 2012/0020433 A1 | 1/2012 | Bhattad | | |
| 2012/0314570 A1* | 12/2012 | Forenza | ..................... | H04B 7/024 370/230 |
| 2013/0053079 A1* | 2/2013 | Kwun | ..................... | H04B 7/024 455/509 |
| 2013/0058239 A1* | 3/2013 | Wang | ..................... | H04B 7/0417 370/252 |
| 2013/0170445 A1 | 7/2013 | Khojastepour | | |
| 2014/0038653 A1* | 2/2014 | Mildh | ..................... | H04W 28/048 455/501 |
| 2014/0064109 A1* | 3/2014 | Krishnamurthy | .... | H04J 11/0053 370/252 |
| 2015/0245370 A1* | 8/2015 | Arogyaswami | ..... | H04W 72/121 370/330 |
| 2015/0245371 A1 | 8/2015 | Arogyaswami | | |

* cited by examiner

SCHEDULING IN A CELLULAR COMMUNICATION SYSTEM USING A LARGE EXCESS NUMBER OF BASE STATION ANTENNAS

CROSS REFERENCE TO RELATED APPLICATIONS

This application is a continuation of U.S. patent application Ser. No. 14/202,921, filed Mar. 10, 2014 (now U.S. Pat. No. 9,370,017, issued Jun. 14, 2016), which claims the benefit of U.S. Provisional Patent Application No. 61/943,022, filed Feb. 21, 2014, U.S. Provisional Patent Application No. 61/811,563, filed Apr. 12, 2013, and U.S. Provisional Patent Application No. 61/811,572, filed Apr. 12, 2013, all of which are incorporated by reference herein.

TECHNICAL FIELD

This application relates generally to scheduling in a cellular communication system that uses a large excess number of base station antennas.

BACKGROUND

In a cellular communication system, multiple antennas at a base station (BS) and multiple antennas at one or more user terminals (UTs) served by the BS allow two or more independent data streams to be transmitted from the BS to the UT(s) over the same time-frequency interval. The specific transmission technique that makes this possible is referred to as spatial multiplexing. In general, spatial multiplexing is a multiple-input, multiple-output (MIMO) transmission technique that uses the different "paths" or channels that exist between the multiple antennas at the BS and the multiple antennas at the one or more UTs to spatially multiplex the independent data streams over the same time-frequency interval. When one UT is served two or more independent data streams by the BS over the same time-frequency interval, the system is said to be performing single-user MIMO (SU-MIMO), and when multiple UTs are each served one or more independent data streams by the BS over the same time-frequency interval, the system is said to be performing multi-user MIMO (MU-MIMO).

The number of independent data streams that can be transmitted over the same time-frequency interval can be shown to be limited by the lesser of the number of antennas at the BS and the total number of antennas at the one or more UTs. A further limitation on the number of independent data streams that can be transmitted over the same time-frequency interval results from interference between the independent data streams or what is referred to as inter-user interference in the MU-MIMO context.

In T. L. Marzetta, "Noncooperative Cellular Wireless with Unlimited Numbers of Base Station Antennas," *IEEE Transactions on Wireless Communications*, vol. 9, no. 11, pp. 3590-3600, November 2010 [Marzetta], concept referred to as "massive MIMO" was introduced. In general terms, massive MIMO refers to a communication system that has a large number of excess antennas available at the BS over the number of independent data streams to be transmitted over the same time-frequency interval. The excess antennas are used to reduce inter-user interference by further focusing the energy of each independent data stream into ever-narrower regions of space. This is done by appropriately shaping the independent data streams so that the wave fronts emitted by the available antennas for each of the independent data streams add up constructively at the location of the UT intended to receive the independent data stream and destructively everywhere else (or at least everywhere else where another UT is intended to receive a different independent data stream over the same time-frequency interval). The process of shaping the independent data streams at the BS is known as precoding.

Although inter-user interference can be reduced using the concept of massive MIMO, for a practical number of excess antennas at the BS, inter-user interference can still affect downlink data transmissions without proper scheduling.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, the term "module" shall be understood to include software, firmware, or hardware (such as one or more circuits, microchips, processors, and/or devices), or any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

I. Overview

The present disclosure is directed to a system and method for selecting a sub-group of UTs among, a group of UTs served by a sector of a cellular network to schedule independent data streams for transmission to over the same time-frequency interval. In one embodiment, the sub-group of UTs is selected to limit inter-user interference among the sub-group of UTs. In another embodiment, the sub-group of UTs is selected to limit inter-user interference experienced by a UT that is at or near the boundary of a sector that is adjacent to the sector that serves the sub-group of UTs. These and other features of the system and method of the present disclosure are described further below.

II. System and Method for Scheduling Downlink Transmissions

Figure 1:
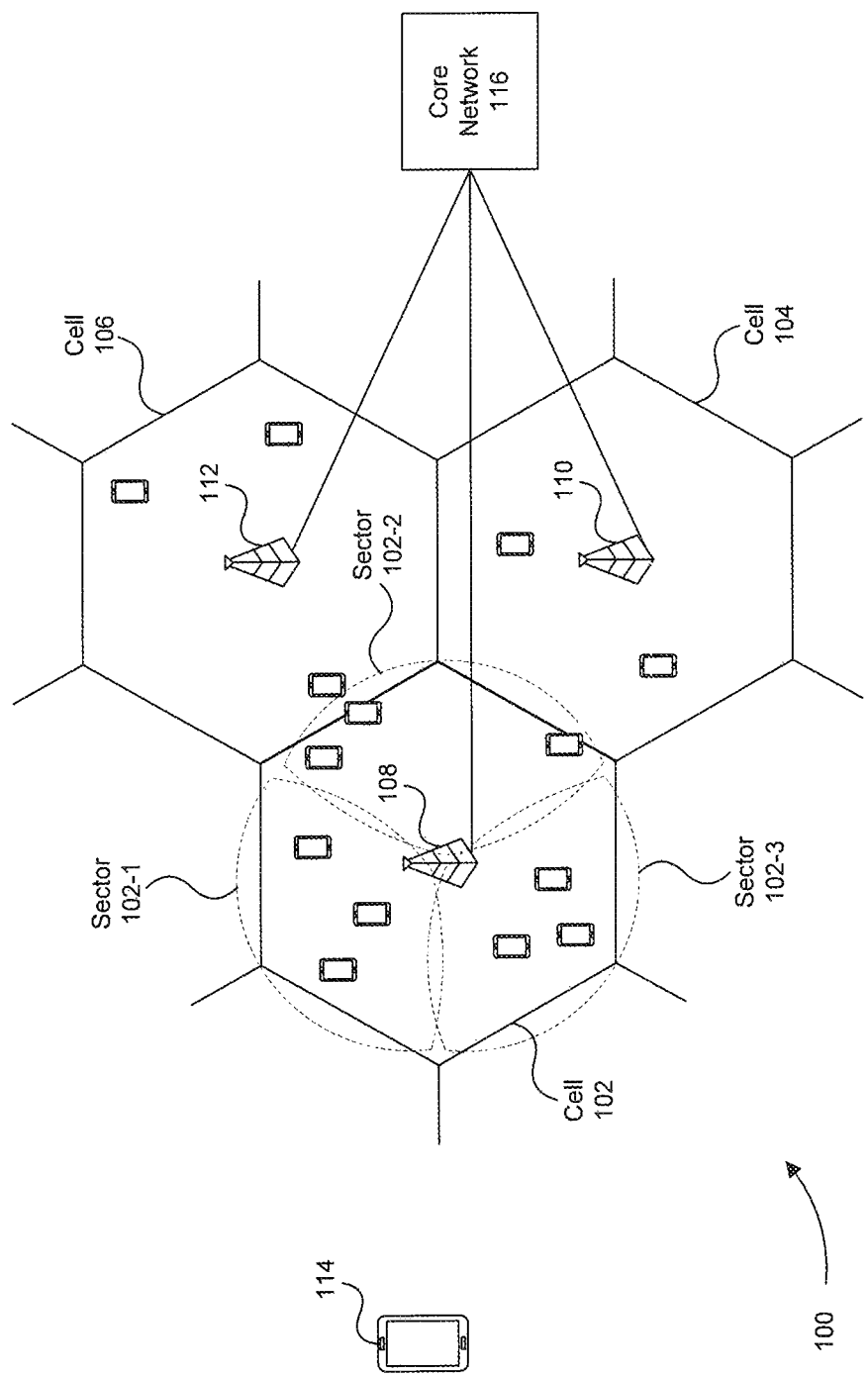
FIG. 1 illustrates an exemplary cellular network in which embodiments of the present disclosure can be implemented.

FIG. 1 illustrates an exemplary cellular network 100 in which embodiments of the present disclosure can be implemented. Cellular network 100 is divided up into cells 102-106 that are each served by a respective base station (BS) 108-112. Each cell 102-106 can, in-turn, be further divided up into sectors. For example, as shown in FIG. 1, cell 102 is divided up into three sectors 102-1, 102-2, and 102-3. Cells 102-106 and their associated sectors are geographically joined together to enable user terminals (UTs) 114 (e.g., mobile phones, laptops, tablets, pagers, or any other de ice with an appropriate wireless modem) to wirelessly communicate over a wide area with a core network 116 via BSs 108-112. Cellular network 100 can be operated in accordance with any one of a number of different cellular network standards, including one of the current or yet to be released versions of the long-term evolution (LTE) standard and the worldwide interoperability for microwave access (WiMAX) standard.

For at least sector 102-1, BS 108 has an excess number of transmit antennas available to transmit independent data streams over the same time-frequency interval to two or more UTs 114 located in sector 102-1. BS 108 is configured to use the excess transmit antennas in conjunction with precoding to appropriately shape the independent data streams before they are transmitted to reduce interference between the independent data streams or what is referred to as inter-user interference. The excess transmit antennas are specifically used to further focus the energy of each independent data stream into narrower regions of space in accordance with the concept of massive MIMO.

Figure 2:
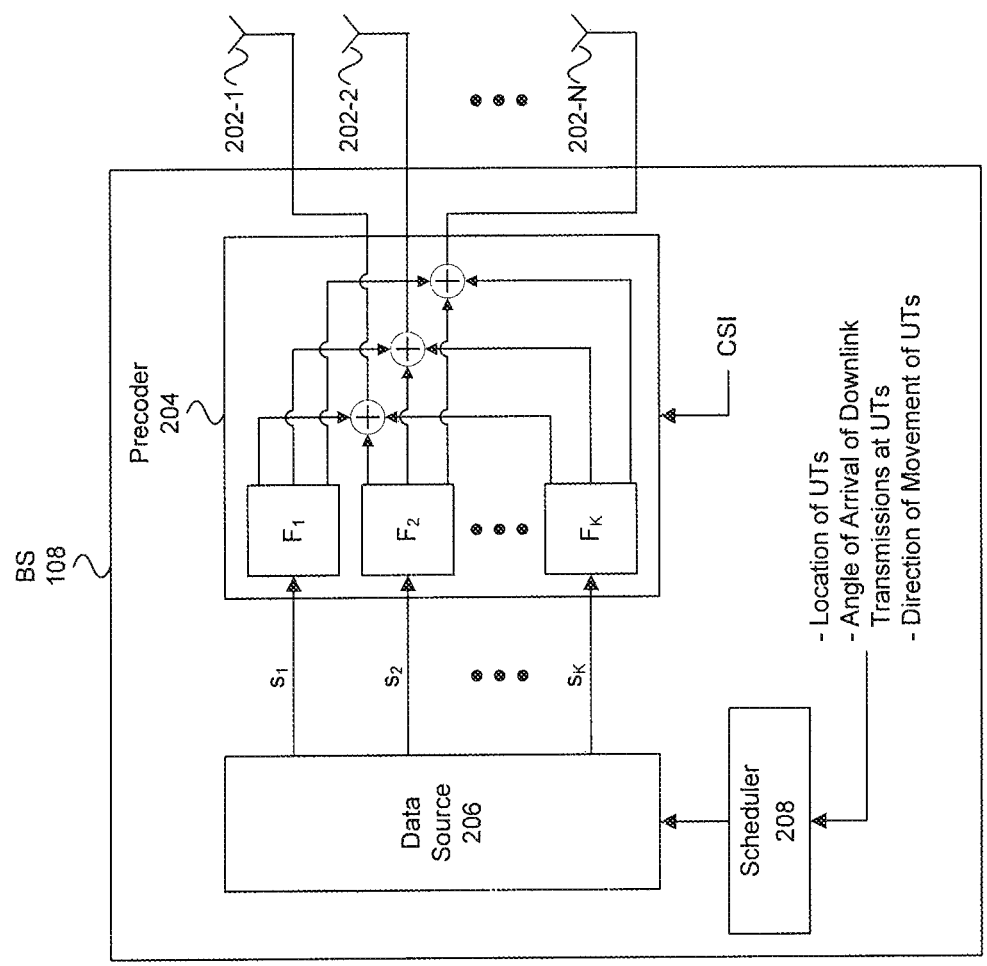
FIG. 2 illustrates a block diagram of an exemplary BS in accordance with embodiments of the present disclosure.

Referring now to FIG. 2, an exemplary block diagram of BS 108 is illustrated in accordance with embodiments of the present disclosure. BS 108 includes, for transmitting downlink to UTs located in sector 102-1, N transmit antennas 202-1 through 202-N, a precoder 204, a data source 206, and a scheduler 208.

As explained above in FIG. 1, BS 108 is configured to transmit independent data streams over the same time-frequency interval to two or more UTs 114 located in sector 102-1. BS 108 uses precoder 204 to precode the independent data streams before they are transmitted to reduce inter-user interference. Several different precoding techniques can be used, including matched-filter (MF) precoding, zero-forcing (ZF) precoding, minimum-mean square error (MMSF) precoding, and, with some modifications to precoder 204, non-linear precoding techniques such as vector perturbation. In FIG. 2, the independent data streams are specifically labeled $s_1$ through $s_K$ and are provided to precoder 204 by data source 206.

The precoded signal output by precoder 204 can be written as $$x = \Sigma_{i=1 \, to \, K} F_i s_i, \quad (1)$$

where $s_i$ is the independent data stream for the i-th UT, $F_i$ is an N×1 precoding vector for the i-th UT, and K is the number of independent data streams to be transmitted. Based on the precoded signal x being appropriately fed to and transmitted by the N transmit antennas 202-1 through 202-N, the symbol received by the UT intended to receive the k-th independent data stream $s_k$ can be written as:

$$\begin{aligned} y_k &= H_k \cdot x + n_k, \\ &= H_k \cdot \sum_{i=1 \, to \, K} F_i s_i + n_k, \end{aligned} \quad (2)$$

where $n_k$ is a vector representing noise and $H_k$ is a 1×N channel matrix for the UT.

The symbol $y_k$ includes interference from the symbols of the independent data streams intended for other UTs. This component of interference, as explained above, is referred to as inter-user interference and can be written as:

$$H_k \cdot \Sigma_{i=1 \, to \, K}{}^{i \neq k} F_i s_i. \quad (3)$$

As noted above, BS 108 includes an excess number of transmit antennas over the number of independent data streams $s_1$ through $s_K$ to be transmitted. BS 108 is configured to use the excess transmit antennas in conjunction with precoding to appropriately shape the different independent data streams before they are transmitted to reduce inter-user interference as given by Eq. (3). The excess transmit antennas are specifically used to further focus the energy of each independent data stream into narrower regions of space in accordance with the concept of massive MIMO.

Although inter-user interference can be reduced using the concept of massive MIMO, for a practical number of excess transmit antennas at BS 108, inter-user interference can still significantly affect downlink data transmissions without proper scheduling. Example scenarios where proper scheduling can better leverage the narrower downlink beams to reduce inter-user interference are described below.

Figure 3A:
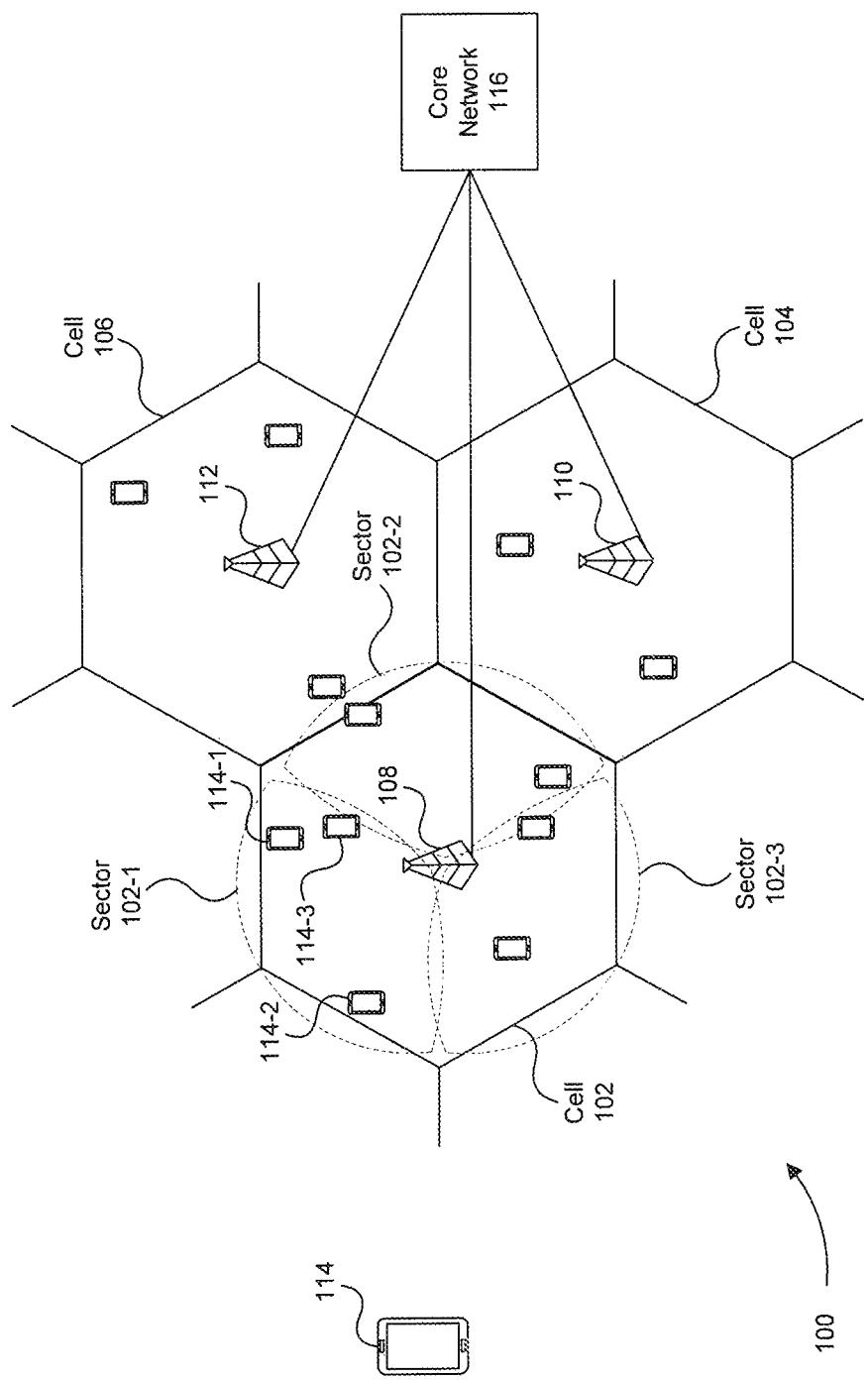
FIG. 3A illustrates an exemplary scenario in which scheduling can be used to reduce inter-user interference in accordance with embodiments of the present disclosure.

Referring now to FIG. 3A, a scenario is shown using exemplary cellular network 100 described above in FIG. 1 where scheduling can be used to better leverage the narrower downlink beams provided by massive MIMO to reduce inter-user interference experienced by the at least three UTs 114-1, 114-2, and 114-3 located in and served by sector 102-1.

As shown in FIG. 3A, UT 114-1 is located in close proximity to UT 114-3. Because UT 114-1 is located in close proximity to UT 114-3, downlink transmissions to UT 114-1 are more likely to overlap and interfere with downlink transmissions to UT 114-3 that occur over the same time-frequency interval. Depending on how close UT 114-1 is to UT 114-3, the downlink transmissions to these two UTs may overlap and interfere even with the narrower downlink beams provided by the excess transmit antennas at BS 108.

Therefore, in one embodiment, scheduler 208, further included in BS 108 as shown in FIG. 2, can select a sub-group of UTs from among the UTs served by sector 102-1 to transmit independent data streams to over the same time-frequency interval based on the locations of the UTs. In particular, the sub-group of UTs can be selected based on the locations of the UTs to limit inter-user interference among the sub-group of UTs. For example, scheduler 208 can include UTs in the sub-group of UTs that have sufficient space between themselves and the other UTs included in the sub-group of UTs. The amount of space deemed sufficient can be determined based on for example, the number of excess transmit antennas available at BS 108 to transmit downlink to the UTs. This is because more excess antennas support the formation of narrower antenna beams. In the scenario shown in FIG. 3A, scheduler 208 may select UT 114-2 and 114-3 to form, at least in part, one sub-group of UTs and select UT 114-1 to form, at least in part, another sub-group of UTs because of its close proximity to UT 114-3.

Scheduler 208 can receive the locations of the UTs served by sector 102-1 as input as shown in FIG. 2. The locations of the UTs served by sector 102-1 can be determined, for example, via triangulation using the global positioning system (GPS) satellites and/or via triangulation using BSs in cellular network 100.

In addition to the above, if two or more UTs served by sector 102-1 receive downlink transmissions from BS 108 at similar angles (relative to the orientation of the BS antennas), downlink transmissions to the two or more UTs from BS 108 that occur over the same time-frequency interval are more likely to overlap and interfere.

Therefore, in another embodiment, scheduler 208 can select a sub-group of UTs from among, the UTs served by sector 102-1 to transmit independent data streams to over the same time-frequency interval based on the angle at which downlink signals from BS 108 are received by the UTs. In particular, the sub-group of UTs can be selected based on the angle at which downlink signals from BS 108 are received by the UTs to limit inter-user interference among the sub-group of UTs. For example, scheduler 208 can include UTs in the sub-group of UTs that receive downlink signals from BS 108 at sufficiently different angles than the other UTs included in the sub-group of UTs.

Scheduler 208 can receive the angles at which downlink signals from BS 108 are received by the UTs served by sector 102-1 as input as shown in FIG. 2. As would be appreciated by one of ordinary skill in the art, the angle at which a downlink signal transmitted by BS 108 is received by a UT can be determined, for example, based on the angle at which an uplink signal transmitted by the UT is received by BS 108, as these angles are likely reciprocal.

After selecting a sub-group of UTs based on the location of the UTs or the angle at which downlink signals from BS 108 are received by the UTs, scheduler 208 can schedule an independent data stream for each UT in the sub-group of UTs for downlink transmission over the same time-frequency interval. As shown in FIG. 2, scheduler 208 can specifically control data source 206 to provide the independent data streams for each UT in the sub-group of UTs at an appropriate time for precoding by precoder 204 and downlink transmission by transmit antennas 202-1 through 202-N.

Figure 3B:
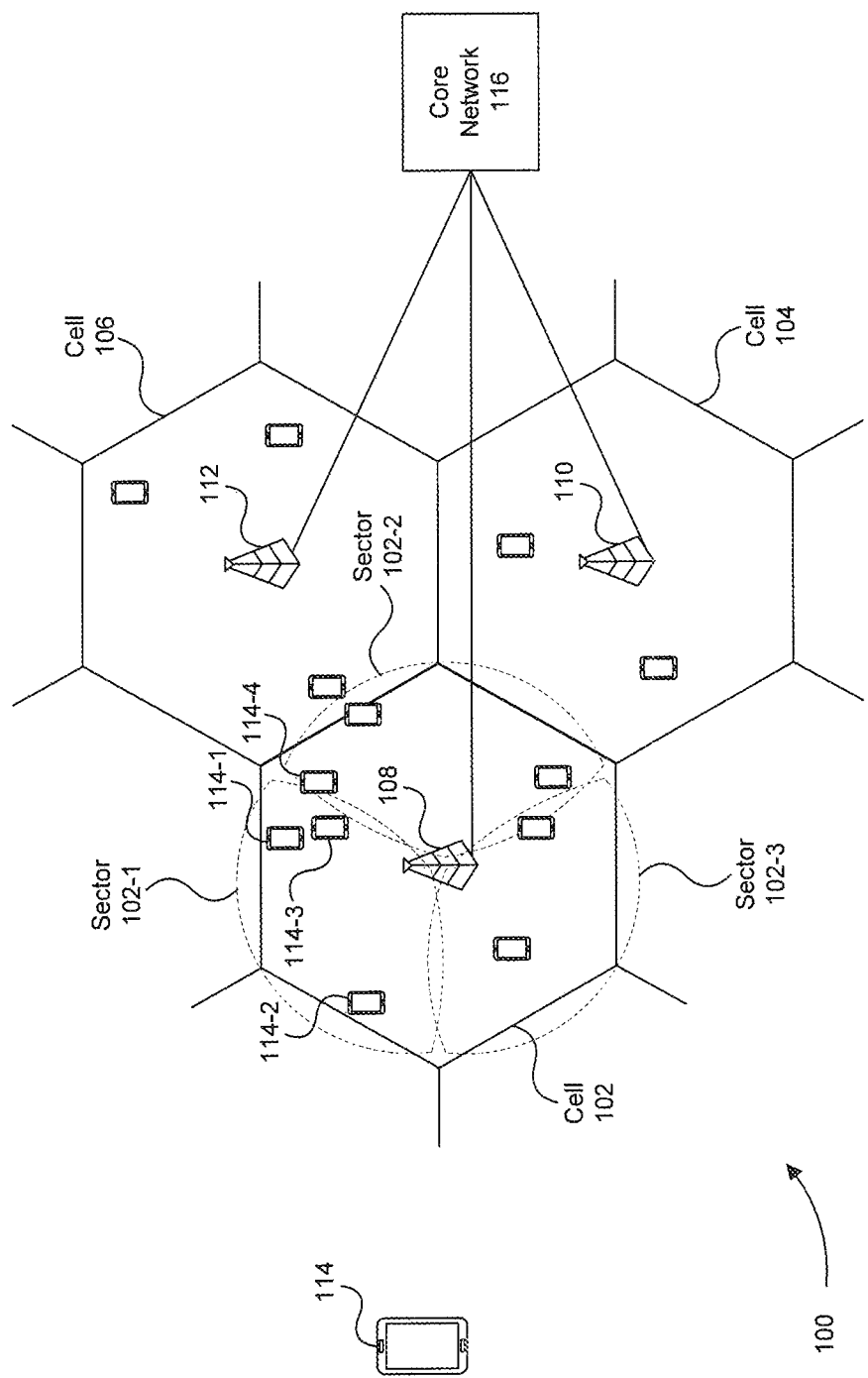
FIG. 3B illustrates another exemplary scenario in which scheduling can be used to reduce inter-user interference in accordance with embodiments of the present disclosure.

Referring now to FIG. 3B, another scenario is shown using exemplary cellular network 100 described above in FIG. 1 where scheduling can be used to better leverage the narrower downlink beams provided by massive MIMO to reduce inter-user interference experienced by an edge UT 114-4 served by sector 102-2 from downlink transmissions to one or more of the at least three UTs 114-1, 114-2, and 114-3 served by sector 102-1. An edge UT, such as edge UT 114-4, is a UT that is at or near the edge of a sector of a cell.

Typically, UTs in one sector of a cell experience negligible amounts of interference from the downlink transmissions to UTs in another, adjacent sector of a cell. This is because the energies of downlink transmissions emitted by the transmit antennas of one sector are mainly contained within that sector and only low levels of energy from those downlink transmissions permeate into adjacent sectors. However, for an edge UT that is at or near the edge of the sector it is served by, the downlink transmissions to UTs in the sector adjacent to the sector serving the edge UT can interfere with the edge UTs ability to receive downlink transmissions.

Therefore, coordination techniques were developed to prevent the downlink transmissions from the adjacent sector from interfering with the downlink transmissions to the edge UT from its serving sector. For example, in one such coordination technique, the BS of the adjacent sector is prevented from transmitting downlink to the UTs of the adjacent sector over the same time-frequency interval that the BS of the sector serving the edge UT is transmitting downlink to the edge UT. In another coordination technique, the BS of the adjacent sector transmits downlink over the same time-frequency interval that the BS of the sector serving the edge UT is transmitting downlink to the edge UT but with a reduced power level to limit interference. In general, both techniques require some coordination between the BSs of the two cells or, if the two sectors are served by the same BS, some coordination between the hardware used by the BS for each sector.

With the narrower downlink beams provided by massive MIMO, a different coordination technique involving scheduling, can be implemented to reduce inter-user interference (also referred to as inter-sector interference in this context) experienced by the edge UT 114-4 from downlink transmissions to one or more of the at least three UTs 114-1, 114-2, and 114-3.

For example, as shown in FIG. 3B, UT 114-3 served by sector 102-1 is located in close proximity to UT 114-4 served by sector 102-2. Because UT 114-3 is located in close proximity to UT 114-4, downlink transmissions to UT 114-3 are more likely to overlap and interfere with downlink transmissions to UT 114-4 that occur over the same time-frequency interval even with narrower downlink beams. Downlink transmissions to the other UTs 114-1 and 114-2 are less likely to overlap and interfere with downlink transmissions to UT 114-4 that occur over the same time-frequency interval because of the distance between the UTs.

Therefore, in one embodiment scheduler 208 can select a sub-group of UTs from among the UTs served by sector 102-1 to transmit independent data streams to over the same time-frequency interval that edge UT 114-4 is scheduled to receive an independent data stream based on the locations of the UTs. In particular, the sub-group of UTs can be selected based on the locations of the UTs served by sector 102-1 and the location of edge UT 114-4 to limit inter-user interference at edge UT 114-4. For example, scheduler 208 can include UTs in the sub-group of UTs that have sufficient space between themselves and the edge UT 114-4. The amount of space deemed sufficient can be determined based on, for example, the number of excess transmit antennas available at BS 108 to transmit downlink to the UTs served by sector 102-1.

In the scenario shown in FIG. 3B, scheduler 208 may select UT 114-1 and 114-2 to form one sub-group of UTs and schedule independent data streams for transmission to those UTs over the same time-frequency interval that edge UT 114-4 is scheduled to receive an independent data stream. Because of its close proximity to UT 114-4, scheduler 208 may further select UT 114-3 to form, at least in part, another sub-group of UTs and schedule independent data streams for transmission to those UTs over a different time-frequency interval than edge UT 114-4 is scheduled to receive an independent data stream to limit inter-user interference or inter-sector interference) at edge UT 114-4.

Scheduler 208 can receive the locations of the UTs served by sector 102-1 and the location of edge UT 114-4 as input. The location of edge UT 114-4 can be sent to scheduler 208 via a message from the hardware used by BS 108 to communicate with the UTs of sector 102-2. In addition to the location of edge UT 114-4, messages can be passed between the respective hardware used by BS 108 to communicate with the UTs of sectors 102-1 and 102-2 to determine a time and/or frequency that downlink transmissions are scheduled to be transmitted to edge UT 114-4. This message passing between the respective hardware used by BS 108 to communicate with the UTs of sectors 102-1 and 102-2 can viewed as a type of coordination between sectors 102-1 and 102-2.

Figure 3C:
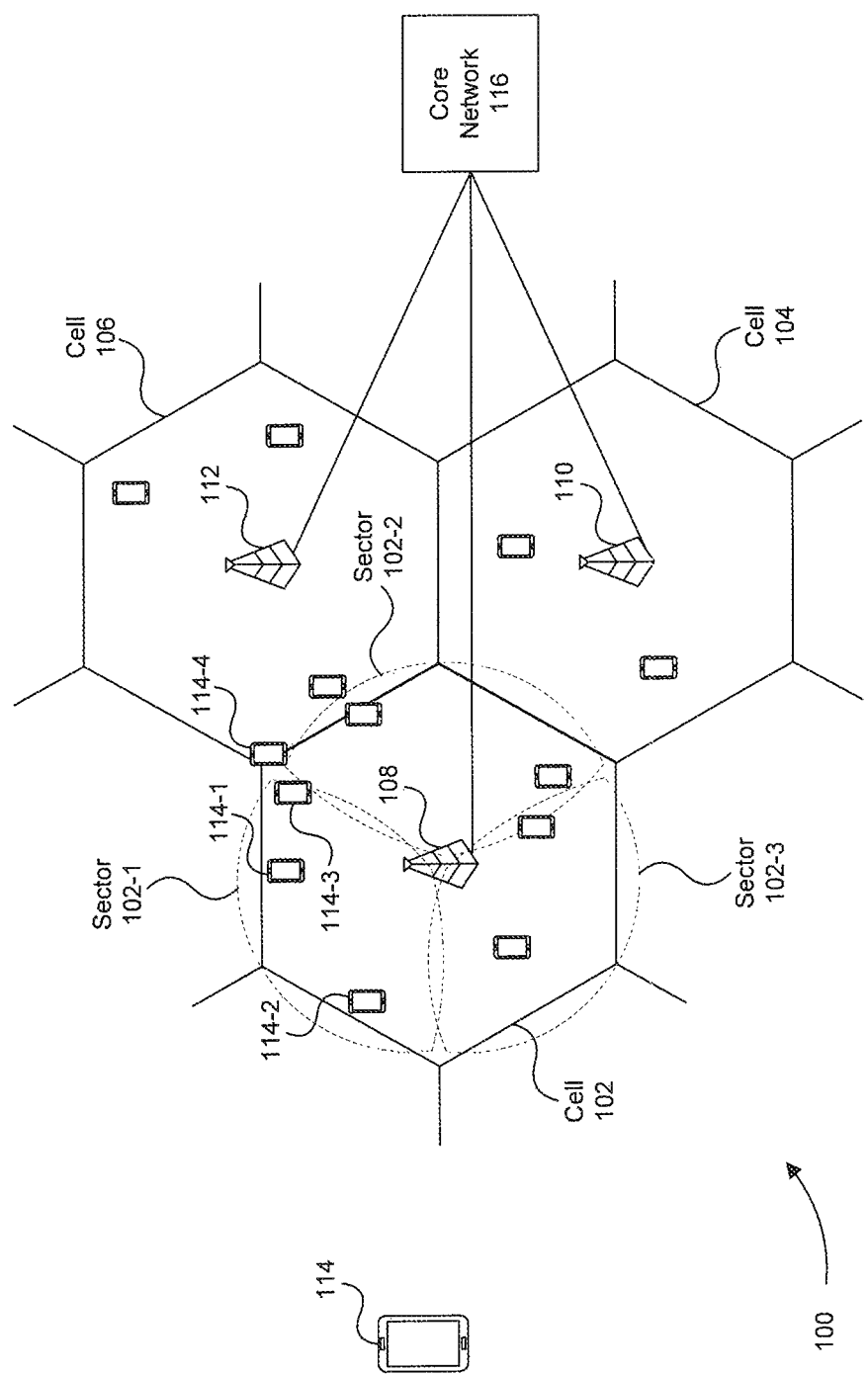
FIG. 3C illustrates another exemplary scenario in which scheduling can be used to reduce inter-user interference in accordance with embodiments of the present disclosure.

It should be noted that edge UT 114-4 can be located on the edge of a sector of a different cell than cell 102. For example, as shown in FIG. 3C, edge UT 114-4 can be served by and located on the edge of a sector in cell 106. The same scheduling technique described above can be used to reduce inter-user interference (or inter-cell interference in this context) experienced by edge UT 114-4 from downlink transmissions to one or more of the at least three UTs 114-1, 114-2, and 114-3. The main difference would be that the messages described above would be passed between BS 108 and BS 112.

Figure 3D:
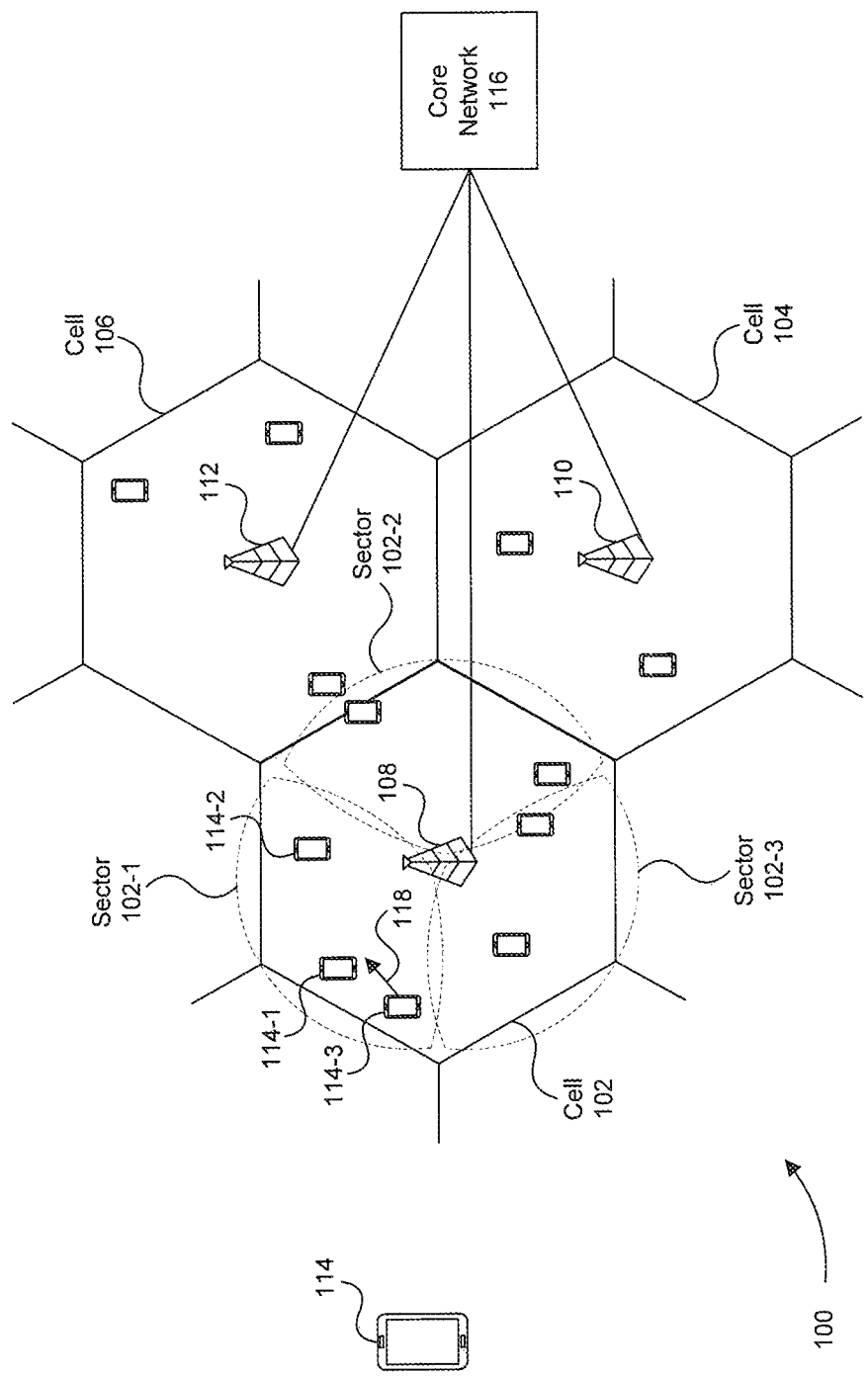
FIG. 3D illustrates another exemplary scenario in which scheduling can be used to reduce inter-user interference in accordance with embodiments of the present disclosure.

Referring now to FIG. 3D, a scenario is shown again using exemplary cellular network 100 described above in FIG. 1 where scheduling can be used to better leverage the narrower downlink beams provided by massive MIMO to reduce inter-user interference experienced by the at least three UTs 114-1, 114-2, and 114-3 located in and served by sector 102-1 of cell 102.

In general as opposed to just selecting a sub-group of UTs from among the UTs served by sector 102-1 to transmit independent data streams to over the same time-frequency interval based on the locations of the UTs, as described above in FIG. 3A, FIG. 3D illustrates that selecting the sub-group of UTs based on locations of the UTs and the direction of movement of the UTs can be further beneficial. In particular, the direction of movement of the UTs can be used to predicate whether two UTs will eventually come in close proximity to each other such that the two UTs should not be selected to be a part of a sub-group of UTs to schedule independent data streams for transmission to over the same time-frequency interval. Assuming two UTs eventually come in close proximity to each other, the downlink transmissions to the two UTs may overlap and interfere even with the narrower downlink beams provided by the excess transmit antennas at BS 108.

For example, FIG. 3D illustrates the location of UTs 114-1, 114-2, and 114-3 and further illustrates a vector 118 that shows the direction of movement of UT 114-3. Scheduler 208 can select a sub-group of UTs from among the UTs served by sector 102-1 to transmit independent data streams to over the same time-frequency interval based on the locations of the UTs and the direction of movement of UT 114-3. In particular, the sub-group of UTs can be selected based on the locations of the UT's and the direction of movement of UT 114-3 to limit inter-user interference among the sub-group of UTs. For example, scheduler 208 can include UTs in the sub-group of UTs that have sufficient space between themselves and the other UTs included in the sub-group of UTs and that are predicted, based on their current direction of movement, to not come in close proximity to one another. In the scenario shown in FIG. 3D, scheduler 208 may select UT 114-2 and 114-3 to form, at least in part, one sub-group of UTs but not include UT 114-1 in such a group because, based on the location of 114-3 and its current direction of movement, it may come within close proximity to UT 114-1.

In another embodiment, the number of UTs in a sub-group to receive independent data streams over the same time-frequency interval can be adjusted or determined based on a speed of one or more UTs in the sub-group. If one or more UTs in the sub-group are moving fast, as determined for example based on some speed threshold, then the number of UTs in the sub-group can be reduced. If, on the other hand, one or more UTs in the sub-group are moving slow, as determined for example based on some speed threshold, then the number of UTs in the sub-group can be increased.

The average speed of one or more UTs in the sub-group can also be used to determine or adjust the number of UTs in the sub-group that are to receive independent data streams over the same time-frequency interval. For example, if the average speed is fast, as determined for example based on some speed threshold, then the number of UTs in the sub-group can be reduced. If, on the other hand, the average speed is slow, as determined for example based on some speed threshold, then the number of UTs in the sub-group can be increased.

Finally, if the speed of a UT in the sub-group is above some speed threshold, that UT can be removed from the sub-group and transmitted to downlink in an SU-MIMO mode to reduce inter-user interference. Scheduler 208 can further perform the above noted adjustments based on speed.

In another embodiment, the beam widths associated with the downlink transmissions to one or more of the UTs served by sector 102-1 can be adjusted. For example, the beam width of a downlink transmission to a UT served by sector 102-1 can be adjusted based on a speed at which the UT is moving. If the UT is moving fast, it may be hard to continually update the direction of the beam of downlink transmission at the UT. Therefore, the beam width of the downlink transmission can be widened so that the UT has a wider area over which to receive the downlink transmission.

In another embodiment, the beam widths associated with the downlink transmissions to one or more of the UTs served by sector 102-1 can be adjusted based on a desired downlink throughput and/or desired reliability with which the downlink data is received by the UT. In general, widening the beam width may reduce the overall energy density of the beam and downlink data rate to the UT, but may improve the reliability with which the downlink data is received by the UT, and narrowing the beam width may increase the overall energy density of the beam and downlink data rate to the UT, but may reduce the reliability with which the downlink data is received by the UT.

In one embodiment, the beam width of a downlink transmission to a UT is adjusted by adjusting the precoding vector used to precode the downlink transmission to the UT. In another embodiment, the beam width is adjusted by increasing or reducing the number of excess transmit antennas at BS 108 used to transmit downlink to the UT.

Figure 4:
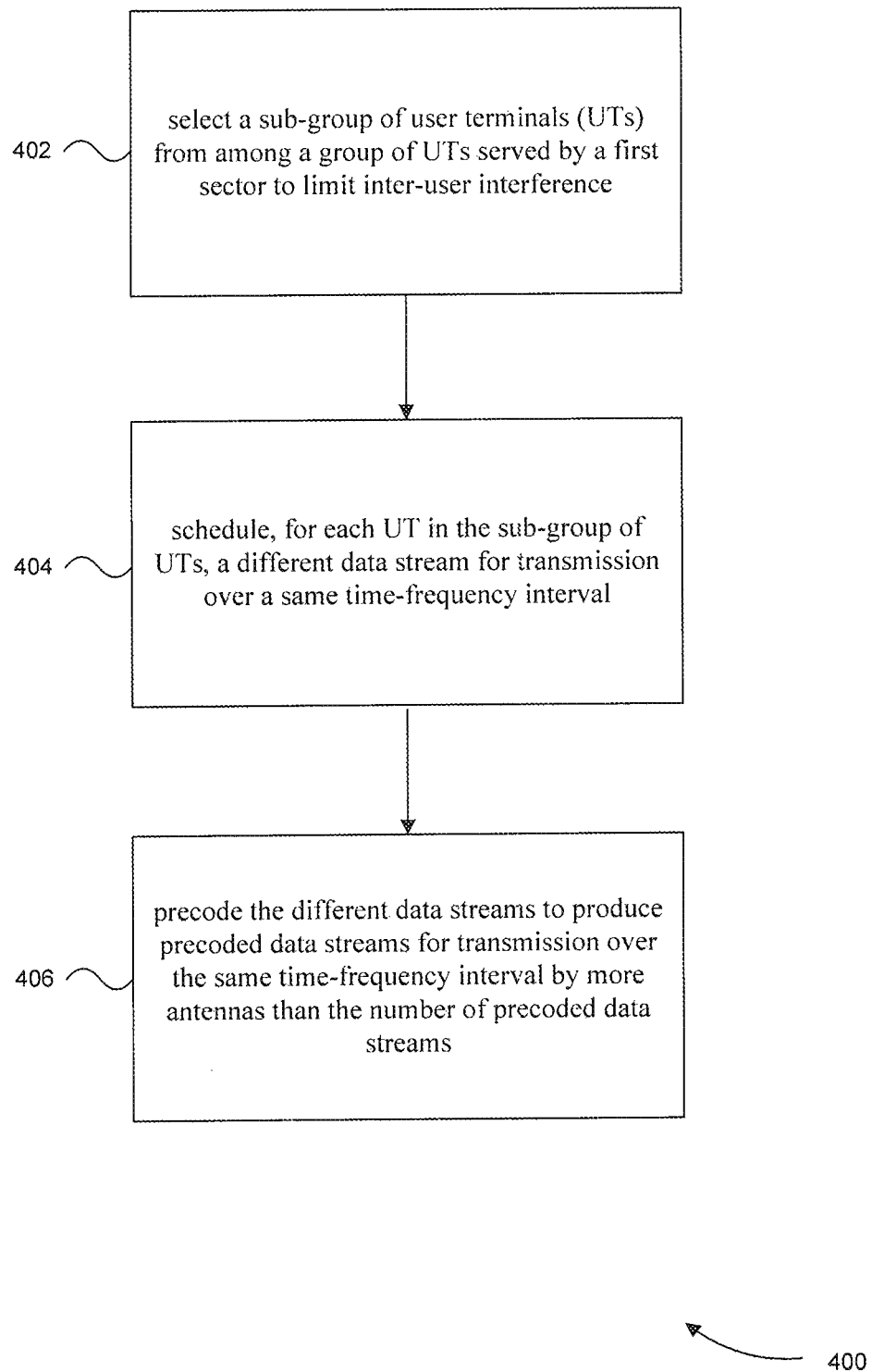
FIG. 4 illustrates a flowchart of a method for scheduling in a cellular communication system that uses a large number of excess transmit antennas in accordance with embodiments of the present disclosure.

Referring now to FIG. 4, a flowchart 400 of a method for scheduling in a cellular communication system that uses a large number of excess transmit antennas is illustrated in accordance with embodiments of the present disclosure. The method of flowchart 400 can be implemented by BS 108 as described above and illustrated in FIG. 2. However, it should be noted that the method can be implemented by other systems and components as well.

The method of flowchart 400 begins at step 402. At step 402, a sub-group of UTs from among a group of his served a first sector of a cellular network, such as sector 102-1 illustrated in FIG. 1, is selected to limit inter-user interference. More specifically, as discussed above, the sub-group of UTs is selected to limit inter-user interference among the sub-group of UTs and/or to limit inter-user interference experienced by a UT that is at or near the boundary of a sector that is adjacent to the sector that serves the sub-group of UTs. For example, as discussed above, the sub-group of UTs can be selected to serve one of these purposes based on a location of one or more UTs, an angle of arrival of downlink transmissions at one or more UTs, or a location and direction of movement of one or more UTs. After the sub-group of UTs is selected, flowchart 400 proceeds to step 404.

At step 404, a different data stream for transmission over a same time-frequency interview is scheduled for each UT in the sub-group.

Finally, at step 406, the different data streams are precoded to produce precoded data streams for transmission over the same time-frequency interval by more antennas than the number of precoded data streams.

It should be noted that, although the present disclosure was described above as being directed to a system and method for selecting a sub-group of UTs to schedule independent downlink data streams for transmission to over the same time-frequency interval, it will be apparent to one of ordinary skill in the art based on the teachings herein that the same system and method with slight modifications can be used for selecting a sub-group UTs to schedule independent uplink data streams for transmission to over the same time-frequency interval.

III. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
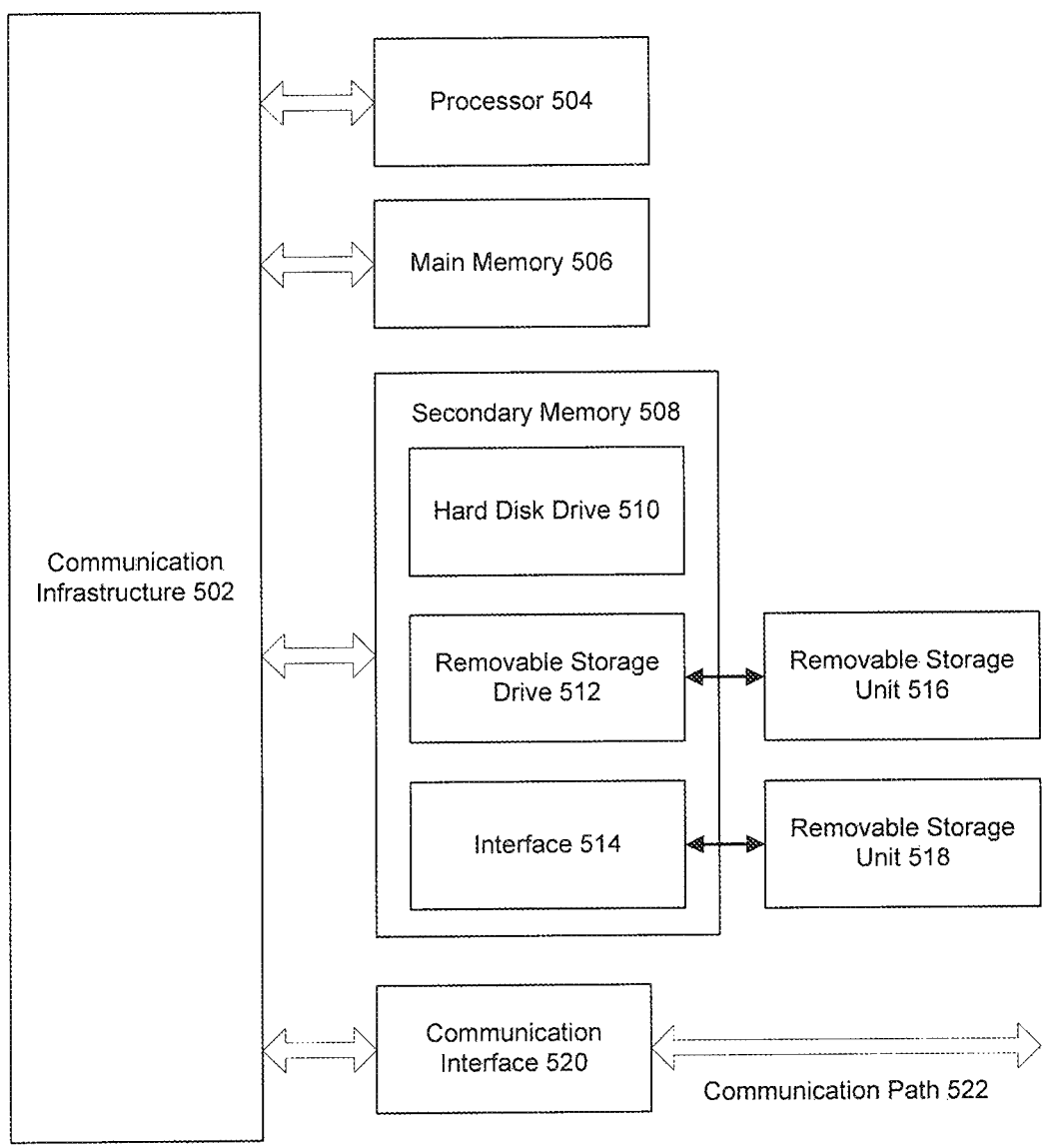
FIG. 5 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. Modules depicted in FIGS. 1 and 2 may execute on one or more computer systems 500. Furthermore, each of the steps of the flowchart depicted in FIG. 4 can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interlace 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510. These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

IV. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method, comprising:
   selecting a subgroup of user terminals (UTs) from among a group of UTs served by a sector;
   scheduling, for each UT in the subgroup of UTs, a different data stream for transmission over a same time-frequency interval; and
   precoding the different data streams to produce precoded data streams for transmission over the same time-frequency interval by a plurality of antennas, wherein the plurality of antennas comprise excess antennas determined based on the number of precoded data streams,
   wherein selecting the subgroup of UTs further comprises selecting the subgroup of UTs based on a location of at least two UTs in the group of UTs and the number of excess antennas.

2. The method of claim 1, wherein selecting the subgroup of UTs further comprises:
   predicting whether the location of the at least two UTs will result in increased inter-user interference among the subgroup of UTs.

3. The method of claim 1, wherein selecting the subgroup of UTs further comprises:
   selecting the subgroup of UTs to include the at least two UTs based on the at least two UTs not resulting in increased inter-user interference among the subgroup of UTs.

4. The method of claim 1, wherein selecting the subgroup of UTs further comprises:
   selecting, the subgroup of UTs to not include the at least two UTs based on the at least two UTs being predicted to result in increased inter-user interference among the subgroup of UTs.

5. The method of claim 1, wherein precoding the different data streams to produce precoded data streams further comprises:
   adjusting a beam width associated with one of the precoded data streams.

6. The method of claim 5, wherein adjusting the beam width comprises:
   adjusting the beam width based on a speed of movement of a UT associated with the one of the precoded data streams.

7. The method of claim 5, wherein adjusting the beam width comprises:
   adjusting the beam width based on a desired reliability with which the one of the precoded data streams is to be received by a UT associated with the one of the precoded data streams.

8. The method of claim 5, wherein adjusting the beam width comprises:
   adjusting the beam width based on a desired throughput with which the one of the precoded data streams is to be received by a UT associated with the one of the precoded data streams.

9. A method, comprising:
   selecting a subgroup of user terminals (UTs) from among a group of UTs served by a sector;
   scheduling, for each UT in the subgroup of UTs, a different data stream for transmission over a same time-frequency interval;
   precoding the different data streams to produce precoded data streams for transmission over the same time-frequency interval by a plurality of antennas, wherein the plurality of antennas comprise excess number of antennas determined based on the number of precoded data streams; and
   adjusting a beam width associated with one of the precoded data streams by increasing or decreasing the excess number of antennas used to transmit the one of the precoded data streams.

10. The method of claim 9, wherein the adjusting the beam width further comprises:
    adjusting the beam width based on a speed of movement of a UT associated with the one of the precoded data streams.

11. The method of claim 9, wherein the adjusting the beam width further comprises:

adjusting the beam width based on a desired reliability with which the one of the precoded data streams is to be received by a UT associated with the one of the precoded data streams.

12. The method of claim 9, wherein the adjusting the beam width further comprises:
adjusting the beam width based on a desired throughput with which the one of the precoded data streams is to be received by a UT associated with the one of the precoded data streams.

13. The method of claim 9, wherein the adjusting the beam width further comprises:
adjusting the beam width based on a number of UTs in the subgroup of UTs.

14. A system, comprising:
a scheduler, stored on a memory and executed by a processor, configured to schedule, for each UT in a subgroup of UTs, a different data stream for transmission over a same time-frequency interval; and
a precoder circuit configured to receive the different data streams from the scheduler and precode the different data streams to produce recoded data streams for transmission over the same time-frequency interval by a plurality of antennas, wherein the plurality of antennas comprise excess antennas determined based on the number of precoded data streams,
wherein the scheduler is configured to select the subgroup of UTs from among a group of UTs based on a location of at least two UTs in the group of UTs and the number of excess antennas.

15. The system of claim 14, wherein the scheduler is configured to select the subgroup of UTs to include the at least two UTs based on the at least two UTs being predicted to not result in increased inter-user interference among the subgroup of UTs.

16. The system of claim 14, wherein the precoder circuit is further configured to adjust a beam width associated with one of the precoded data streams.

17. The system of claim 16, wherein the precoder circuit is further configured to adjust the beam width associated with the one of the precoded data streams based on a speed of movement of a UT associated with the one of the precoded data streams.

18. The system of claim 16, wherein the precoder circuit is further configured to adjust the beam width associated, with the one of the precoded data streams based on a desired reliability with which the one of the precoded data streams is to be received by a UT associated with the one of the precoded data streams.

19. The system of claim 16, wherein the precoder circuit is further configured to adjust the beam width associated with the one of the precoded data streams based on a desired throughput with which the one of the precoded data streams is to be received by a UT associated with the one of the precoded data streams.

20. The system of claim 14, wherein the scheduler is further configured to adjust a number of UTs of the subgroup of UTs based on a speed of one or more UTs in the subgroup of UTs.

* * * * *

UNITED STATES PATENT AND TRADEMARK OFFICE
CERTIFICATE OF CORRECTION

PATENT NO. : 9,794,954 B2
APPLICATION NO. : 15/135295
DATED : October 17, 2017
INVENTOR(S) : Jindal et al.

Page 1 of 1

It is certified that error appears in the above-identified patent and that said Letters Patent is hereby corrected as shown below:

In the Claims

In Column 13, Line 22, replace "recoded" with --precoded--.

In Column 14, Line 15, replace "associated," with --associated--.

Signed and Sealed this
Twenty-eighth Day of May, 2019

Andrei Iancu
*Director of the United States Patent and Trademark Office*